United States Patent
Parasirakis et al.

(10) Patent No.: US 8,055,550 B2
(45) Date of Patent: *Nov. 8, 2011

(54) FLEXIBLE ORDER STRUCTURE

(75) Inventors: Emmanuel Parasirakis, West Roxbury, MA (US); Tareef S. Kawaf, Sudbury, MA (US)

(73) Assignee: Art Technology Group, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/047,975

(22) Filed: Mar. 13, 2008

(65) Prior Publication Data

US 2008/0162288 A1    Jul. 3, 2008

Related U.S. Application Data

(63) Continuation of application No. 09/989,670, filed on Nov. 21, 2001, now Pat. No. 7,353,189.

(60) Provisional application No. 60/309,403, filed on Aug. 1, 2001.

(51) Int. Cl.
    *G06Q 30/00* (2006.01)
(52) U.S. Cl. ........................ 705/26.1; 705/1.1
(58) Field of Classification Search ................ 705/26.1, 705/1.1
    See application file for complete search history.

(56) References Cited

U.S. PATENT DOCUMENTS

| | | | | |
|---|---|---|---|---|
| 5,987,423 A | * | 11/1999 | Arnold et al. | 705/14 |
| 2002/0007321 A1 | * | 1/2002 | Burton | 705/26 |
| 2002/0103714 A1 | * | 8/2002 | Eze | 705/26 |
| 2002/0128919 A1 | * | 9/2002 | Rime et al. | 705/26 |
| 2002/0169675 A1 | * | 11/2002 | Helot et al. | 705/26 |
| 2003/0005406 A1 | * | 1/2003 | Lin et al. | 717/102 |

* cited by examiner

*Primary Examiner* — Jagdish Patel
*Assistant Examiner* — Sara Chandler
(74) *Attorney, Agent, or Firm* — Squire, Sanders & Dempsey (US) LLP

(57) ABSTRACT

An order processing system includes an order structure in which an order includes multiple objects representing items being purchased, shipping methods, payment parameters, and other parts of an order. The order can include one or more of each of the types of objects. Items in the order can be divided among shipping methods and payment mechanisms using a relationship model to describe the relationships between the different types of objects. Shipping methods and payment mechanisms also can be related. The order may be represented as an order object, which represents the order and can be related to particular shipping methods and payment mechanisms. Relationship objects describe the relationships between objects. Relationship objects can use different relationship types to characterize the extent of the specified relationship.

21 Claims, 5 Drawing Sheets

Figure 2

Relationship

| | |
|---|---|
| Relationship ID | ___ 210 |
| Related Objects | ___ 215 |
| | ___ 220 |
| Relationship Type | ___ 230 |
| Quantity/Amt | ___ 240 |

Relationship Type Values

| Value | Relationship Type |
|---|---|
| 1 | ShippingQuantity |
| 2 | ShippingQuantityRemaining |
| 3 | PaymentAmount |
| 4 | PaymentPercentage |
| 5 | PaymentQuantity |
| 6 | PaymentAmountRemaining |
| 7 | ShippingAmount |
| 8 | ShippingAmountRemaining |
| 9 | OrderAmount |
| 10 | OrderPercentage |
| 11 | OrderAmountRemaining |
| 12 | TaxAmount |
| 13 | TaxAmountRemaining |

300

FLEXIBLE ORDER STRUCTURE

CROSS-REFERENCE TO RELATED APPLICATIONS

This Application is a Continuation of and claims priority under 35 U.S.C. §120 to U.S. patent application Ser. No. 09/989,670 filed on Nov. 21, 2001 and entitled Flexible Order Structure, which claims priority under 35 U.S.C. §119(e) to Provisional application No. 60/309,403 filed on Aug. 1, 2001. The entire contents of U.S. patent application Ser. No. 09/989,670 and Provisional application No. 60/309,403 are incorporated herein by reference in their entireties.

FIELD OF THE INVENTION

This invention relates to computer systems and, more particularly, to systems for facilitating electronic commerce.

BACKGROUND OF THE INVENTION

With electronic commerce systems, users interact with the system over a network, such as the WorldWide Web or some other public or private network. As electronic commerce systems become more popular and more sophisticated, users will expect the ability to replicate the types of flexibility and features in fulfilling an order that exist with "brick and mortar" stores and, in many cases, will want additional order features. In the business-to-business context, for example, buyers will want a system that works with their purchasing requirements and procedures.

One area in which existing electronic commerce systems do not provide satisfactory mechanisms is in providing flexibility to divide an order in multiple ways, based on different parameters. For example, an order may contain multiple items and the buyer may want to have those items shipped to different locations. Also, a buyer may want to pay for an order using different payment mechanisms. Existing systems provide only a limited ability to divide an order in this and other ways.

SUMMARY OF THE INVENTION

The present invention uses a relationship model to describe how different parts of an order in an electronic commerce system relate to each other. An order processing system permits a buyer (user) to purchase multiple items as part of a single order. In a typical example, parts of the order can be shipped to different locations and the buyer can pay for the order using multiple payment mechanisms. The order processing system provides the buyer with flexibility as to how to ship each item and how to pay and account for different parts of the order, such as the product costs for some or all of the items, or the shipping costs associated with various shipping methods.

An order includes different types of objects, such as item objects, shipping objects, payment objects, cost center objects, and/or handling objects. The order can include one or more of each of these or other types of order-related objects (or none of one or more types of order-related objects that are not needed or not used in a particular application). An order may be represented by an order object, which represents the order rather than specific items within the order.

Relationship objects describe a relationship between two (or more) of these objects. Thus, for example, a relationship object may describe a relationship between a particular item object and a particular shipping object, where the shipping object would characterize how some or all of the units within the item object will be shipped. The different types of objects can have relationships with one or more objects of another type and with one or more different types of objects. The objects (other than item objects, in a typical example) also can have relationships with the order object, to characterize the order to the extent not otherwise characterized by relationships with other order-related objects.

Different relationship types can be used to characterize the extent of the relationship. In one embodiment, a relationship can exist for a specified quantity of units, an amount, or a percentage of the price. Also, a relationship can exist for the remaining items or amount beyond those items or amounts for which specified quantities, amounts, or percentages have been described. Relationship types also can be used to characterize other cost items, such as taxes.

BRIEF DESCRIPTION OF THE DRAWINGS

FIG. 2 is a diagram illustrating a structure for use with an embodiment of the present invention.

FIG. 3 is a diagram illustrating a structure for use with an embodiment of the present invention.

DETAILED DESCRIPTION OF PREFERRED EMBODIMENTS

Figure 1:
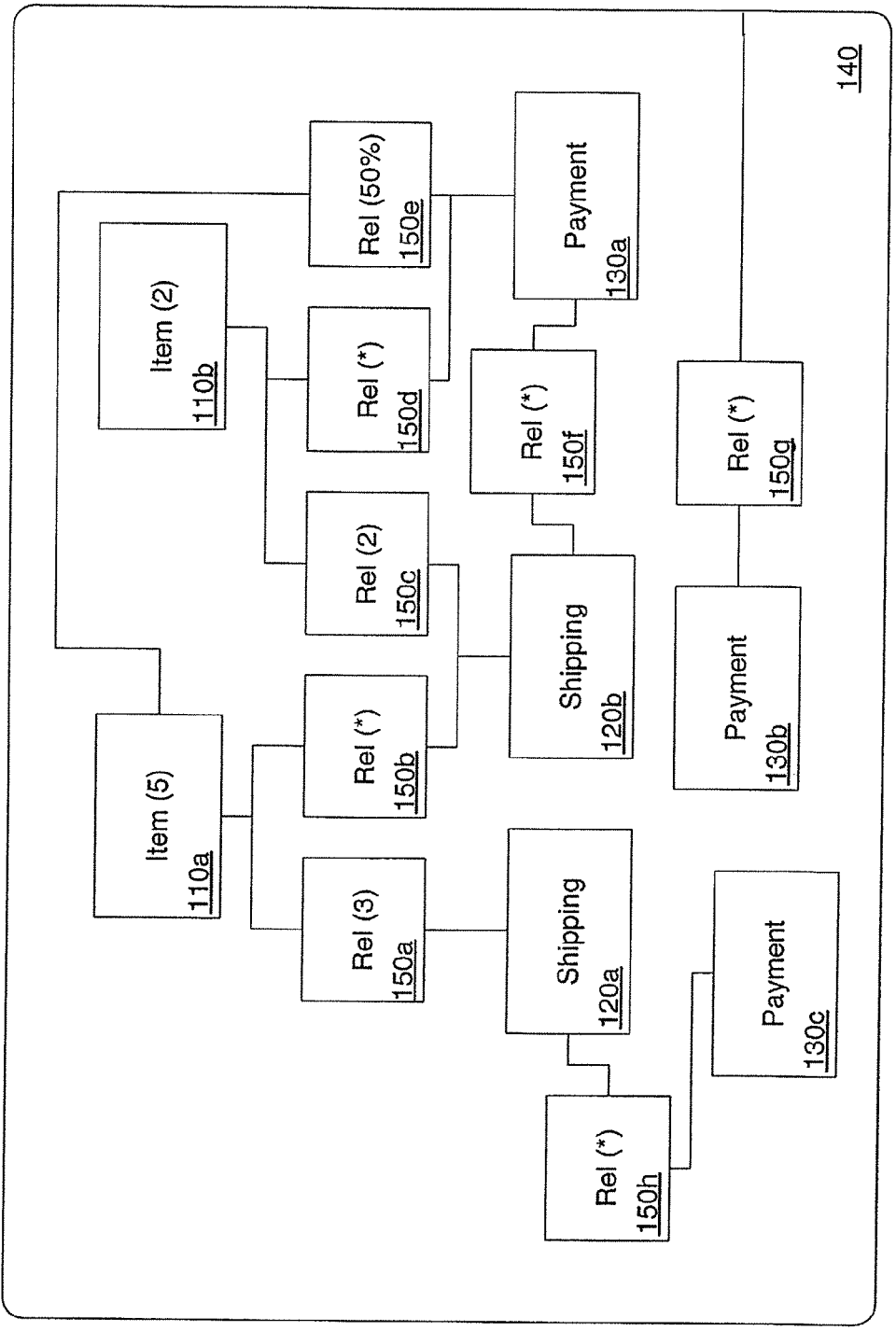
FIG. 1 is a block diagram illustrating a structure for an order according to an embodiment of the present invention.

As shown in FIG. 1, an order 140 can include multiple objects representing different aspects of an order. In this example, the order includes item objects 110, shipping objects 120, and payment objects 130. Although more than one of each of these objects is shown, it should be understood that fewer or more of each of these objects could be included, as appropriate. In one embodiment, order 140 is an object. Order object 140 represents the order itself, including the items in the order and costs associated with the order.

An item object 110 relates to a single item that is being purchased and preferably relates to a single SKU or type of item. The item object can include one or more units of that item, and identifies the item, the quantity of units in the item, and the cost per item. Alternatively, the item object can include related items or SKUs, such as items of the same style but different colors, sizes, or other characteristics. In this alternative case, the item object may also identify one or more of the characteristics of each of the items.

A shipping object 120 relates to a specific shipping method used to send goods to a specific address. The shipping object can reference the address to which the goods are to be shipped and the specific shipping method, such as regular mail, overnight mail, Federal Express, or any other type of delivery service that is available from the seller. The shipping cost may be included or referenced in the shipping object. The shipping object can relate to delivery of hard goods or to electronic delivery of software or some other electronic file. With electronic delivery, the address may be, for example, an email address or the electronic goods may be downloaded through a browser or by any other technique.

A payment object 130 relates to and identifies a specific payment mechanism. The payment mechanism can be a specific credit card, a gift certificate, store credit, store points (such as from a frequent shopper program), a request for an invoice, electronic cash, or any other type of payment that the seller accepts. In one embodiment, the payment object references identifying information about the payment mechanism, such as the relevant credit card information.

In addition to (or other than) item objects, shipping objects, and payment objects, the order can include other types of objects, such as handling objects, which relate to handling charges, or cost center objects, which relate to a specific cost center of the buyer to which a portion of the order will be allocated. Handling charges may be incurred or may vary, for example, if the item is to be gift-wrapped or requires other special packaging.

The order also includes relationships 150. In a preferred embodiment, relationships 150 are objects that relate together two objects of two different types.

An item object can be related to a shipping object, to describe a shipping method to be used for some or all of the units included in that item. An item object also can be related to a payment object, to describe a payment mechanism for all or part of that item. A shipping object that relates to a specific item object can relate to different units and/or a different number of units within the item object than a payment object that relates to the same item object. Where cost center or handling objects are included, they also could relate to an item object. Alternatively, handling instructions and any associated costs can be contained within or be part of a shipping object.

A shipping object, in addition to relating to an item object, can relate to a payment object, to describe how the shipping costs relating to that shipping method will be paid. A shipping object also can relate to an order object, to describe how all or part of an order will be shipped. Alternatively, the order processing system can be structured so that shipping objects do not relate to the order. Where there are one or more shipping objects that relate to one or more item objects, and one or more shipping objects that relate to the order object, the shipping objects that relate to item objects are given priority in determining how an item will be shipped.

A payment object can relate to the order object, and not just to shipping and item objects. The order processing system considers relationships to item objects and shipping objects before it considers relationships to the order. Thus, preference for paying for items or shipping costs is given first to payment objects that relate to item objects or shipping objects, and then (to the extent there are amounts not accounted for) to payment objects that relate to the order object. In one embodiment, handling objects are treated in a similar manner to shipping objects and cost center objects are treated in a similar manner to payment objects.

Relationship objects 150 identify the specific objects that they relate together. In one embodiment, a subclass of a basic relationship object is created for each combination of objects that could be related by a relationship object. Thus, an order processing system with item objects, shipping objects, payment objects, and an order object would have a ShippingObject/Item subclass, a PaymentObject/Item subclass, a PaymentObject/ShippingObject subclass, and a PaymentObject/Order subclass in one embodiment, and would have these subclasses plus a ShippingObject/Order subclass in another embodiment.

As illustrated in FIG. 2, a relationship object 200 includes a relationship identifier 210, identifications 215, 220 of the objects being related, an identification of the type of relationship 230, and the quantity or amount involved in the relationship 240. In one embodiment, the identification of the objects being related takes the form of an identifier or link to each of those objects. Those objects, likewise, include identifiers or links to each relationship object that relates them to another object. The quantity or amount 240 corresponds to the number of units, dollar amount, or percentage covered by the relationship. With relationship types in the form of "- - - Remaining," discussed below, the quantity or amount field may be undefined, not regarded, or given a special value.

For relationship objects that relate an item object and a shipping object, the relationship type can be ShippingQuantity, with a value representing the number of units from the item object that are being shipped by the shipping method specified in that shipping object. Or, the relationship type can be ShippingQuantityRemaining, which indicates that the shipping method specified in that shipping object should be used with any units in the item not covered by a shipping object that is related through a relationship object with the ShippingQuantity relationship type.

For relationship objects that relate an item object and a payment object, the relationship type can be PaymentAmount, PaymentQuantity, PaymentPercentage, or PaymentAmountRemaining. The PaymentAmount relationship type has a value representing the amount of payment for the related item object to be obtained from the payment mechanism specified in the related payment object. The PaymentQuantity relationship type has a value representing the number of units from the item object for which payment is to be obtained from the specified payment mechanism. Similarly, the PaymentPercentage relationship type has a value representing the percentage of the cost of the item object to be obtained from the specified payment mechanism. Preferably, the PaymentAmount, PaymentQuantity, and PaymentPercentage types are given different priorities, for determining the amount allocated to each payment object if the payment objects related to a specific item specify more than the total amount for that item. For example, the highest priority may go to a relationship type of PaymentAmount, then to PaymentPercentage, and then to PaymentQuantity. Thus, a PaymentAmount relationship is applied first, then a PaymentPercentage relationship, then a PaymentQuantity relationship. The PaymentAmountRemaining relationship type indicates that the payment mechanism specified in the related payment object should be used with any amounts for the item that are not covered by other payment objects related to the item.

For relationship objects that relate a shipping object and a payment object, the relationship type can be ShippingAmount or ShippingAmountRemaining. The ShippingAmount relationship type has a value representing the amount of payment for shipping costs from the related shipping object to be obtained from the payment mechanism specified in the related payment object. The ShippingAmountRemaining relationship type indicates that the payment mechanism specified in the related payment object should be used with any shipping costs that are not covered by other payment objects related to the item.

For relationship objects that relate a payment object and the order object, the relationship type can be OrderAmount, OrderPercentage, or OrderAmountRemaining. The OrderAmount relationship type has a value representing the amount of payment for the order to be obtained from the payment mechanism specified in the related payment object. The OrderPercentage payment type has a value representing the percentage of the cost of the order to be obtained from the specified payment mechanism. As with the relationship types for an item object, the OrderAmount and OrderPercentage types are given different priorities, for determining the amount allocated to each payment object if the payment objects related to the order specify more than the total amount for that order. For example, the OrderAmount relationship type may be given priority over the OrderPercentage type. Preferably, the relationship types relating to an item object are given priority over the relationship types relating to the order. The OrderAmountRemaining relationship type indicates that the payment mechanism specified in the related payment object should be used with any amounts for the order that are not covered by other payment objects related to the order, or to order-related objects, such as item objects and shipping objects.

If the order also can have relationships to shipping objects or other types of objects, then relationship types also are specified for those relationships. Where other objects are included in the order, analogous relationship types are included as appropriate. For example, for a cost center object, analogous relationship types to the types for relating a payment object would be provided. Optionally, a cost center object also could be related to a payment object. As another example, for a handling object, analogous relationship types to the types for relating a shipping object would be provided. Optionally, a handling object also could be related to a shipping object. In one embodiment, payments also can be allocated for other cost elements within the order, such as taxes. The relationships to the amount of taxes can be described using relationship types of TaxAmount and TaxAmountRemaining, which can relate the order to a payment object that will be used to pay for all or a portion of the taxes.

In one embodiment, the relationship type is identified by an integer value corresponding to the type. Thus, the relationship type 230 from FIG. 2 corresponds to a value from relationship type values table 300 in FIG. 3. As one example of a set of relationship types, in FIG. 3 a type value of 1 corresponds to a relationship type of ShippingQuantity, a type value of 2 correspond to a relationship type of ShippingQuantityRemaining, a type value of 3 corresponds to a relationship type of PaymentAmount, a type value of 4 corresponds to a relationship type of PaymentPercentage, a type value of 5 corresponds to a relationship type of PaymentQuantity, a type value of 6 corresponds to a relationship type of PaymentAmountRemaining, a type value of 7 corresponds to a relationship type of ShippingAmount, a type value of 8 corresponds to a relationship type of ShippingAmountRemaining, a type value of 9 corresponds to a relationship type of OrderAmount, a type value of 10 corresponds to a relationship type of OrderPercentage, a type value of 11 corresponds to a relationship type of OrderAmountRemaining, a type value of 12 corresponds to a relationship type of TaxAmount, and a type value of 13 corresponds to a relationship type of TaxAmountRemaining. Alternatively, each subclass of relationship objects can have a different set of relationship type values for the relationship types available for that subclass.

Preferably, amounts specified by a quantity or amount are treated as referring to up to that amount. So, for example, if the relationship type is ShippingQuantity, with a value of 5, and it relates to an item object that contains 4 units, then the relationship will include the 4 units in the item object. Or, as another example, if the relationship type is OrderAmount, with a value of $1000, and the total value of the order is $400 or the amount of the order not covered by relationships with specific item or shipping objects is $400, then the specified payment mechanism will be applied to the $400.

An example illustrating some of the above relationships is shown in FIG. 1. Order object 140 includes two item objects, 110a and 110b. Item object 110a has 5 units and item object 110b has 2 units. Order 140 also includes 2 shipping objects, 120a and 120b; three payment objects, 130a through 130c; and 8 relationship objects, 150a through 150h.

Shipping object 120a provides a shipping method for 3 of the items from item object 110a, as indicated by the (3) in relationship object 150a in FIG. 1. Relationship object 150a has a relationship type of ShippingAmount, with a value of 3. Shipping object 120b provides a shipping method for the other 2 items from item object 110a, as indicated by relationship object 150b, in which the (*) indicates that the relationship type is ShippingAmountRemaining. Shipping object 120b also provides a shipping method for the 2 items from item object 110b, as indicated by relationship object 150c, which has a relationship type of ShippingAmount, with a value of 2. For shipping methods, shipping object 120a may provide, for example, for standard shipping to a first address, while shipping object 120b provides for overnight delivery to a second address. Or, shipping object 120a and shipping object 120b could refer to the same shipping method, but to different addresses, or the two shipping objects could refer to the use of two different shipping methods directed to the same address.

Fifty percent of the cost of the items from item object 110a are to be paid using payment object 130a, as indicated by relationship object 150e. Relationship object 150e has a relationship type of PaymentPercentage, with a value, as indicated, of 50%. The remaining 50% of the cost of the item in item object 110a is not specified by a relationship between item object 110a and a payment object, and is therefore covered by payment object 130b, which relates to the order (order object 140) through relationship object 150g. The (*) in relationship object 150g indicates a relationship type of OrderAmountRemaining, for which a value is not designated. All of the cost of the 2 items in item object 110b is provided by the payment mechanism specified in payment object 130a, as indicated by relationship object 150d. The (*) in relationship object 150d indicates that it has a relationship type of PaymentAmountRemaining. Alternatively, a relationship type of PaymentAmount could be used. However, if the intent were to have payment object 130a cover all of the costs of the units in item object 110b, then using a PaymentAmountRemaining or a PaymentPercentage (with a value of 100%) relationship type would ensure that payment object 130a covers all of the costs even if the number of units in item object 110b is increased or the price changes.

The shipping costs for the 2 items from item object 110a and the items from item object 110b that are shipped using the shipping method specified in shipping object 120b are provided by the payment mechanism specified in payment object 130a, as indicated by relationship object 150f. Relationship object 150f has a relationship type of ShippingAmountRemaining, as indicated by the (*). The shipping costs for the 3 items from item object 110a that are shipped using the shipping method specified in shipping object 120a are provided by payment mechanism 130c, as indicated by relationship object 150h. In this example, relationship object 150h also has a relationship type of ShippingAmountRemaining.

Preferably, defaults are provided for shipping and payment, so that a shipping method and a payment mechanism are provided if no particular relationship is specified. In one embodiment, when an order is created a default shipping object and a default payment object are created. Unless an additional shipping object is created, all items will be assigned to the default shipping object. Similarly, unless an additional payment object is created, all items will be assigned to the default payment object.

In one embodiment, before an order can be processed, all items in the order must be fully related to a shipping object and a payment object (either directly or through the order object). This may be determined according to the following set of rules. (1) If the order contains only one shipping object (or payment object) with no defined relationships, then all items are related to that shipping object (or payment object). (2) If the order contains more than one shipping object (or payment object) then either (a) all items must have a relationship to at least one shipping object (or payment object) and all quantities must be accounted for shipping for each item (or the total amount for each item must be accounted for); or (b) order level relationships must account for the shipping (or payment) of the entire order, or as much of the order that is not accounted for at the item level. (3) The total cost of the tax must be accounted for through one or more payment objects. (4) The total cost of all shipping objects must be accounted for through one or more payment objects.

In order to be accounted for, the following rules may apply in one embodiment, in which the order processing system does not permit shipping to be related to an order. The rules may be applied sequentially in the order listed.

Figure 4:
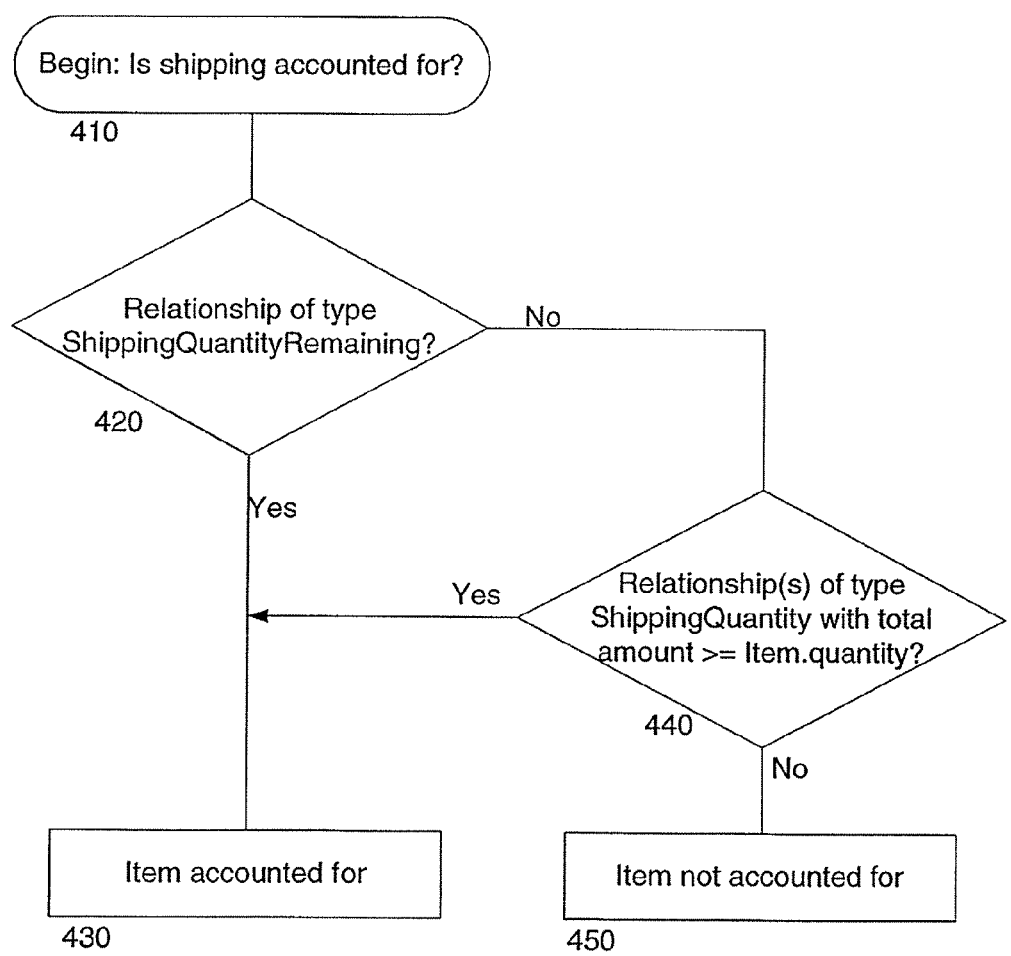
FIG. 4 is a flow diagram of an embodiment of the present invention.

As illustrated in FIG. 4, a determination of whether shipping is accounted for begins with step 410. At step 420, if an item has a relationship of type ShippingQuantityRemaining, then the item is accounted for (step 430), regardless of whether it has other shipping relationships. At step 440, if an item has one or more relationships of type ShippingQuantity and the sum of the quantities for those relationships is equal to or greater than the quantity of the item, then the item is accounted for (step 430). If none of the above, the item is not accounted for (step 450).

Figure 5A:
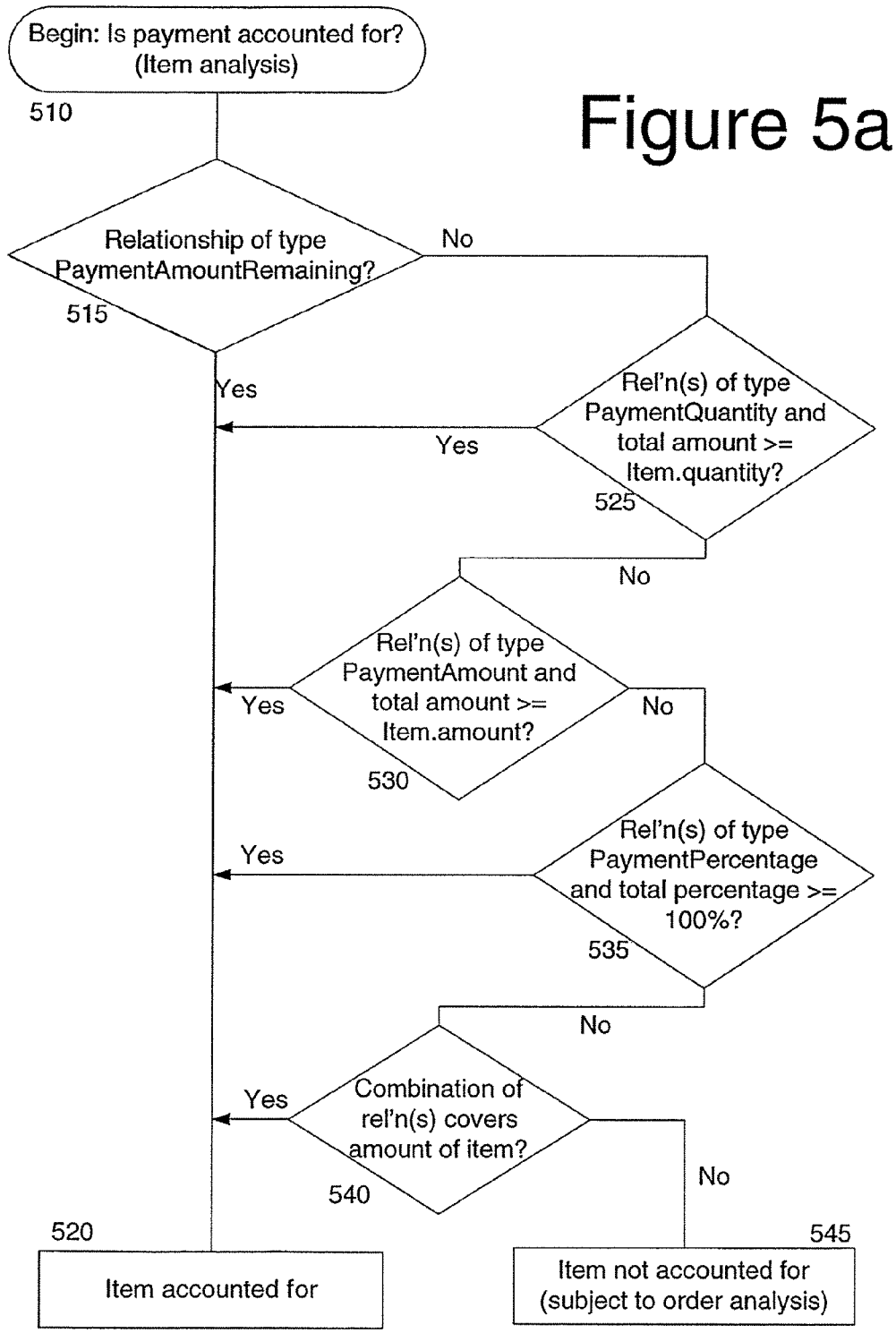
FIGS. 5a and 5b are flow diagrams of an embodiment of the present invention.
Figure 5B:
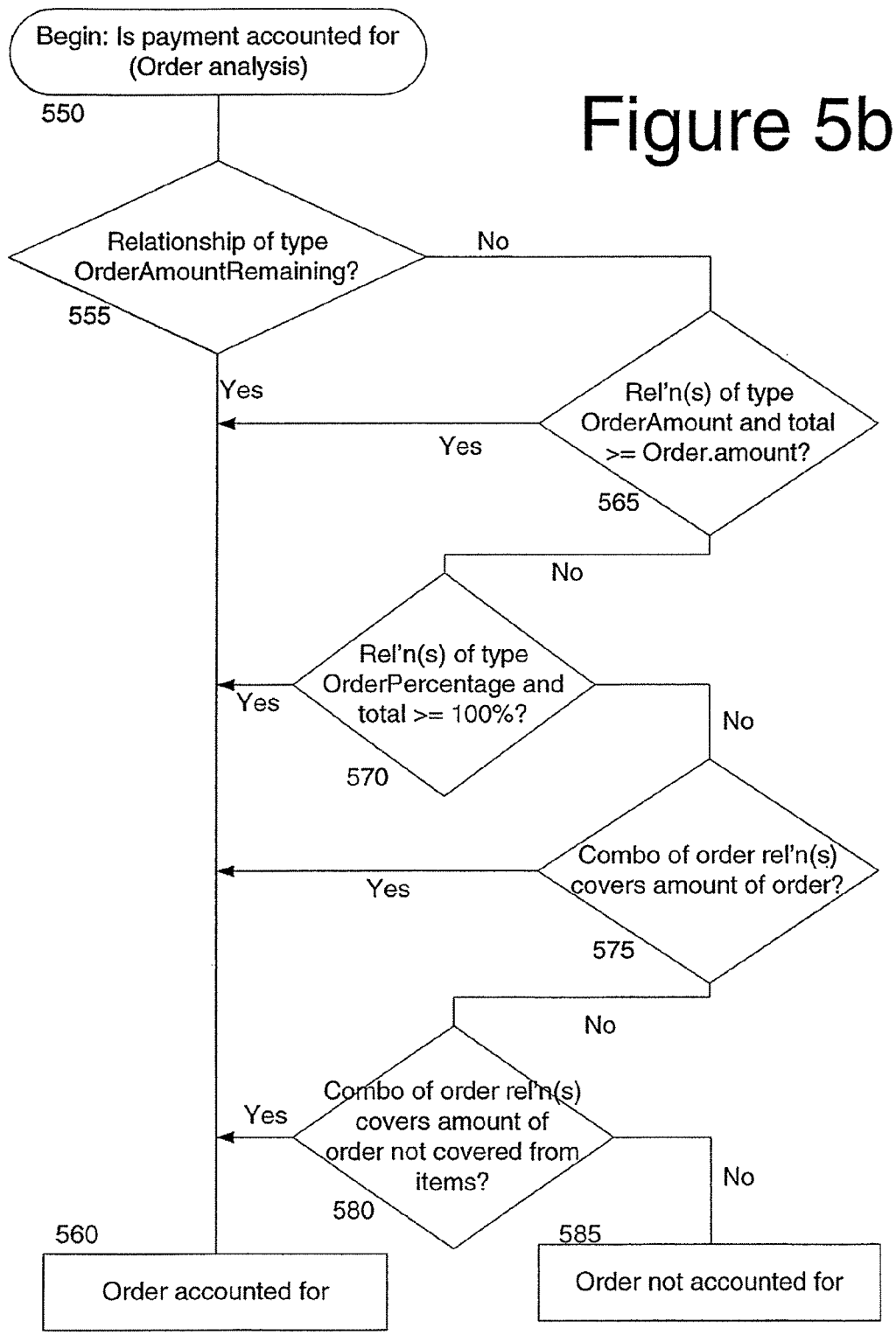

An illustration of steps for determining whether payment for an item or an order is accounted for is shown in FIGS. 5a and 5b. As shown in FIG. 5a, the analysis of an item begins with step 510. At step 515, if an item has a relationship of type PaymentAmountRemaining, then the item is accounted for (step 520) regardless of whether it has other payment relationships. If an item has one or more relationships of type PaymentQuantity and the sum of the quantities of those relationships is equal to or greater than the quantity of the item (the test at step 525), then the item is accounted for. If an item has one or more relationships of type PaymentAmount and the sum of the amounts of those relationships is equal to or greater than the amount of the item (the test at step 530), then the item is accounted for. If an item has one or more relationships of type PaymentPercentage and the sum of the percentages is at least 100% (the test at step 535), then the item is accounted for. At step 540, if the item has a combination of any of the payment relationship types and the combination covers the entire amount of the item, then the item is accounted for. If not, then the item is not accounted for (step 545), subject to an analysis of the order relationships, as illustrated in FIG. 5b.

The analysis of the relationships to the order begins with step 550. At step 555, if an order contains a relationship of type OrderAmountRemaining, then the payment for the order (including each of the items) is accounted for (step 560). If an order contains one or more relationships of type OrderAmount and the sum of the amounts of those relationships is equal to or greater than the amount of the order (the test at step 565), then the order is accounted for. If an order contains one or more relationships of type OrderPercentage and the sum of the percentages is at least 100% (the test at step 570), then the order is accounted for. If the order has a combination of the order payment relationship types and the combination covers the amount of the order (the test at step 575), then the order is accounted for. If the order has a combination of the order payment relationship types and the combination covers the amount of the order that is not accounted for by relationships with items (the test at step 580), then the order is accounted for. Otherwise, the order is not accounted for (step 585).

Other order-related objects can be accounted for in similar ways. For example, if taxes can be treated separately, then the tax portion is accounted for if the order contains a relationship of type TaxAmountRemaining. If an order contains one or more relationships of type TaxAmount and the sum of the amounts of those relationships is equal to or greater than the amount of the taxes, then the tax portion is accounted for. Also, the tax portion can be accounted for if the order contains a relationship of type OrderAmountRemaining, or the order otherwise is completely accounted for. Testing the TaxAmountRemaining and TaxAmount relationships can be performed either before or after testing whether the Order overall is accounted for.

In one embodiment, an item object can have only one relationship with a type of ShippingQuantityRemaining and only one relationship with a type of PaymentAmountRemaining. Alternatively, the order processing system can permit more than one "- - - Remaining" relationship of a certain type, with the goods (or amount) divided among the designated objects. Similar restrictions may be applied with the other "- - - Remaining" relationship types.

A user interface allows the user to create and select default and additional shipping methods and payment mechanisms. In a preferred embodiment, the user selects where to ship goods and how to pay for goods (or uses the defaults), but the underlying relationship structure is transparent to the user. The user is able to add or remove items from a particular shipping method or payment mechanism, to change the items within an order, and otherwise to alter the order. As long as the order remains accounted for, an order can be modified without revising relationships that have been established.

When an item object is related to more than one of a particular type of object, each of that type of object is assigned to specific units within the item. In one embodiment, the units are assigned, by default, according to a priority of the methods or mechanisms. Preferably, the buyer is able to make or change the assignments. This can be useful where, for example, the price varies depending on the quantity purchased. An example is a situation where if the user buys 2 units at the regular price, the user gets a third item at a 50% discount. Using relationship types of PaymentQuantity, the buyer may assign two items to one payment mechanism and a third item to another payment mechanism. By determining which items are assigned to which payment mechanism, the buyer is able to select where the discount will be applied. Similarly, the buyer may want to assign the discounted unit to a specific cost center.

The order processing system may be implemented using software running on a server. In one embodiment, the software is written in Java; however, other software languages could be used. The functionality may be provided as a separate order processing module or integrated as part of an e-business system, such as the Dynamo suite from Art Technology Group of Cambridge, Mass. The order processing software may be provided on any suitable storage device, such as a CD-ROM or magnetic disk (hard disk or floppy), or may be transferred electronically (such as over the Internet).

While there have been shown and described examples of the present invention, it will be readily apparent to those skilled in the art that various changes and modifications may be made without departing from the scope of the invention as defined by the following claims. For example, additional or alternative order-related objects can be used, as appropriate for a specific application. Also, additional or alternative relationship types may be used as appropriate. Accordingly, the invention is limited only by the following claims and equivalents thereto.

What is claimed is:

1. A method for processing an order based on inputs from an ordering user, comprising:
creating, by a processor, an ordered-items object comprising one or more units of one or more items ordered by the user;
creating, by the processor, one or more alternative-mechanism objects, each alternative-mechanism object comprising an alternative mechanism to process a portion of the order, the portion comprising a part of the one or more units of one or more items;
creating, by the processor, a default-mechanism object comprising a mechanism to process a remainder portion of the order, the remainder portion comprising any part of the one or more units of one or more items not included in any portion corresponding to the one or more alternative-mechanism objects;
establishing, by the processor, one or more relationships between the ordered-items object and the one or more alternative mechanism objects, wherein each relationship relates the ordered-items object and one of the one or more alternative-mechanism objects, and wherein each relationship indicates that the corresponding portion is processed by the alternative mechanism of the corresponding alternative-mechanism object;
establishing, by the processor, a default relationship between the ordered-items object and the default-mechanism object when the remainder portion of the order exists, wherein the default relationship indicates that the remainder portion is processed by the mechanism of the default-mechanism object; and
electronically processing, by the processor, the order, by identifying, for each of the one or more relationships, the corresponding portion to be processed by the alternative mechanism of the corresponding alternative-mechanism object, and by identifying, for the default relationship, the remainder portion to be processed by the mechanism of the default-mechanism object.

2. The method of claim 1, wherein the one or more alternative-mechanism objects are a plurality of objects comprising a plurality of different alternative mechanisms to process portions of the order, and wherein, for each relationship, the corresponding portion of the order is not empty.

3. The method of claim 1, wherein the default-mechanism object and the one or more alternative-mechanism objects each comprise a unique method to pay for an ordered unit.

4. The method of claim 3, wherein a first of the one or more alternative-mechanism objects comprises a method to pay for an ordered unit using a virtual currency.

5. The method of claim 4, wherein the virtual currency comprises store points from a frequent shopper program.

6. The method of claim 1, wherein each relationship comprises a type attribute and a quantity attribute, and wherein the type attribute specifies a type for the corresponding portion and the quantity attribute specifies a quantitative value given by the user for the corresponding portion.

7. The method of claim 6, wherein the type attribute comprises a remainder type for the corresponding portion.

8. The method of claim 1, wherein each relationship comprises an amount attribute.

9. A non-transitory computer-readable medium having instructions stored thereon that, when executed by a computer, cause the computer to process an order based on inputs from an ordering user, the instructions comprising:
creating an ordered-items object comprising one or more units of one or more items ordered by the user;
creating one or more alternative-mechanism objects, each alternative-mechanism object comprising an alternative mechanism to process a portion of the order, the portion comprising a part of the one or more units of one or more items;
creating a default-mechanism object comprising a mechanism to process a remainder portion of the order, the remainder portion comprising any part of the one or more units of one or more items not included in any portion corresponding to the one or more alternative-mechanism objects;
establishing one or more relationships between the ordered-items object and the one or more alternative mechanism objects, wherein each relationship relates the ordered-items object and one of the one or more alternative-mechanism objects, and wherein each relationship indicates that the corresponding portion is processed by the alternative mechanism of the corresponding alternative-mechanism object;
establishing a default relationship between the ordered-items object and the default-mechanism object when the remainder portion of the order exists, wherein the default relationship indicates that the remainder portion is processed by the mechanism of the default-mechanism object; and
electronically processing the order, by identifying, for each of the one or more relationships, the corresponding portion to be processed by the alternative mechanism of the corresponding alternative-mechanism object, and by identifying, for the default relationship, the remainder portion to be processed by the mechanism of the default-mechanism object.

10. The non-transitory computer-readable medium of claim 9, wherein the one or more alternative-mechanism objects are a plurality of objects comprising a plurality of different alternative mechanisms to process portions of the order, and wherein, for each relationship, the corresponding portion of the order is not empty.

11. The non-transitory computer-readable medium of claim 9, wherein the default-mechanism object and the one or more alternative-mechanism objects each comprise a unique method to pay for an ordered unit.

12. The non-transitory computer-readable medium of claim 11, wherein a first of the one or more alternative-mechanism objects comprises a method to pay for an ordered unit using a virtual currency.

13. The non-transitory computer-readable medium of claim 12, wherein the virtual currency comprises store points from a frequent shopper program.

14. The non-transitory computer-readable medium of claim 9, wherein each relationship comprises a type attribute and a quantity attribute, and wherein the type attribute specifies a type for the corresponding portion and the quantity attribute specifies a quantitative value given by the user for the corresponding portion.

15. The non-transitory computer-readable medium of claim 14, wherein the type attribute comprises a remainder type for the corresponding portion.

16. The non-transitory computer-readable medium of claim 9, wherein each relationship comprises an amount attribute.

17. An order processing system, comprising:
a storage device configured to store an order processing module; and a server configured to execute the order processing module stored on the storage device;

wherein the server is further configured, when executing the order processing module stored on the storage device, to:

create an ordered-items object comprising one or more units of one or more items ordered by an ordering user;

create one or more alternative-mechanism objects, each alternative-mechanism object comprising an alternative mechanism to process a portion of the order, the portion comprising a part of the one or more units of one or more items;

create a default-mechanism object comprising a mechanism to process a remainder portion of the order, the remainder portion comprising any part of the one or more units of one or more items not included in any portion corresponding to the one or more alternative-mechanism objects;

establish one or more relationships between the ordered-items object and the one or more alternative mechanism objects, wherein each relationship relates the ordered-items object and one of the one or more alternative-mechanism objects, and wherein each relationship indicates that the corresponding portion is processed by the alternative mechanism of the corresponding alternative-mechanism object;

establish a default relationship between the ordered-items object and the default-mechanism object when the remainder portion of the order exists, wherein the default relationship indicates that the remainder portion is processed by the mechanism of the default-mechanism object; and electronically process the order, by identifying, for each of the one or more relationships, the corresponding portion to be processed by the alternative mechanism of the corresponding alternative-mechanism object, and by identifying, for the default relationship, the remainder portion to be processed by the mechanism of the default-mechanism object.

18. The order processing system of claim 17, wherein the one or more alternative-mechanism objects are a plurality of objects comprising a plurality of different alternative mechanisms to process portions of the order, and wherein, for each relationship, the corresponding portion of the order is not empty.

19. The order processing system of claim 17, wherein the default-mechanism object and the one or more alternative-mechanism objects each comprise a unique method to pay for an ordered unit.

20. The order processing system of claim 17, wherein each relationship comprises a type attribute and a quantity attribute, and wherein the type attribute specifies a type for the corresponding portion and the quantity attribute specifies a quantitative value given by the user for the corresponding portion.

21. The order processing system of claim 17, wherein each relationship comprises an amount attribute.

* * * * *